F. L. MORSE.
MULTIPLATE DRIVE CHAIN.
APPLICATION FILED DEC. 15, 1908.

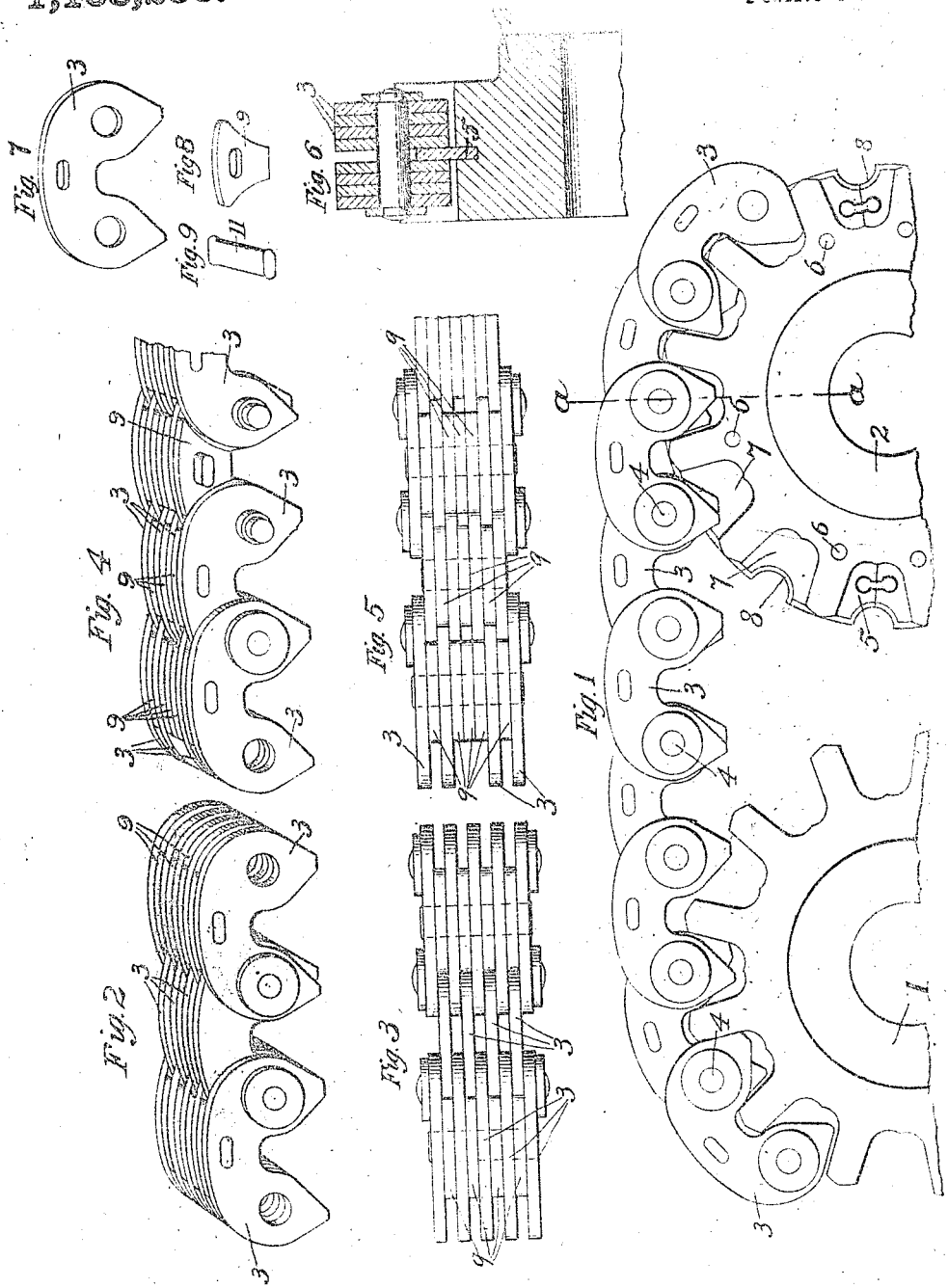

1,138,236.

Patented May 4, 1915.
2 SHEETS—SHEET 2.

WITNESSES

INVENTOR
Frank L. Morse
by E. Wright

UNITED STATES PATENT OFFICE.

FRANK L. MORSE, OF ITHACA, NEW YORK, ASSIGNOR TO MORSE CHAIN COMPANY, OF ITHACA, NEW YORK, A CORPORATION OF NEW YORK.

MULTIPLATE DRIVE-CHAIN.

1,138,236.

Specification of Letters Patent.

Patented May 4, 1915.

Application filed December 15, 1908. Serial No. 467,617.

*To all whom it may concern:*

Be it known that I, FRANK L. MORSE, a citizen of the United States, residing at Ithaca, in the county of Tompkins and State of New York, have invented new and useful Improvements in Multiplate Drive-Chains, of which the following is a specification.

This invention relates to drive chains for power transmission, and more particularly to the type of chain in which the links are composed of a plurality of plates adapted to arch over the sprocket teeth, the chain links being joined by pintles, with the plates forming one link interspersed with the plates of the adjacent link.

One of the objects of my invention is to provide improved means for guiding the drive chain upon the sprocket wheel and this feature of my improvement consists in providing projections on the wheel which are adapted to extend into openings formed in the chain and thereby prevent lateral displacement of the chain on the sprocket wheel.

Another object of my invention relating to the chain guiding means contemplates extending the guiding projections up into openings between the pintles so that the guiding action is always effective regardless of the relative position of the chain on the wheel.

As heretofore constructed, the plates forming the chain links are held in position by the pintles, a slight looseness of the plates being permitted laterally, so as to prevent friction between the plates and consequent stiffness of the joints. It has been found that this slight movement of the plates independently of each other sometimes causes the plates to wear and permits the pintles or pins to work laterally and thereby interfere with the proper operation of the chain.

Another object of my improvement relates to means for overcoming this objectionable feature in multi-plate chains and for this purpose I propose to rigidly secure the plates of a number or all of the links together with spacing pieces or washers interposed between the plates of the links, so as to provide openings for the plates of the adjacent link, thus while permitting free movement between interspersed plates of adjoining links, the plates are rigidly secured together and irregular movements of the plates tending to cause relative lateral movement between the pintles and plates is prevented.

Still another feature of my invention consists in the construction of rigid chain links with spacing pieces or washers interposed between the plates of a link at the middle or arch portion.

Figure 10:
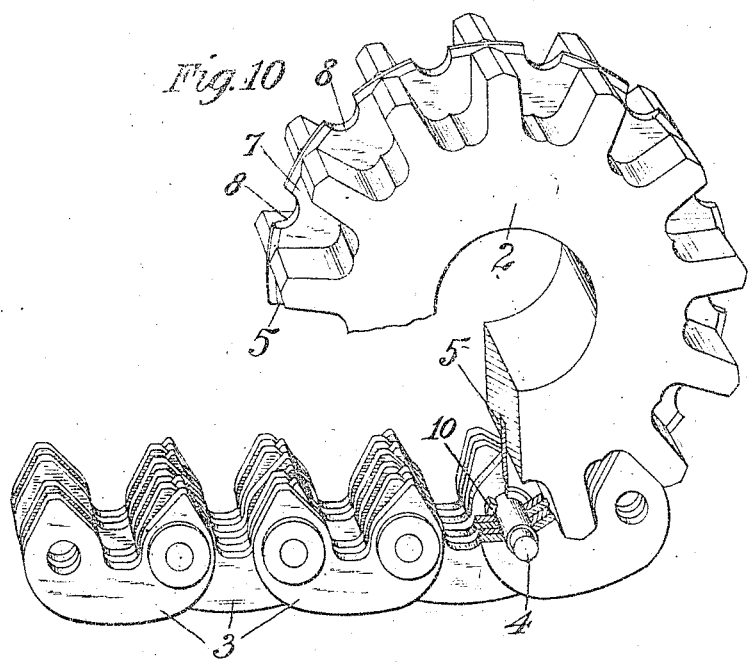

In the accompanying drawings; Figure 1 is a side elevation of a portion of drive chain mounted upon sprocket wheels, showing one form of my improvements applied thereto; Fig. 2 a perspective view of a few links of a chain with every alternate link provided with spacing pieces and rigidly fastened together; Fig. 3 a top plan view of same; Fig. 4 a perspective view of chain links in which each link is made rigid and provided with spacing pieces; Fig. 5 a top plan view thereof; Fig. 6 a transverse section taken on the line $a$—$a$ of Fig. 1; Fig. 7 a perspective view of one of the plates of a link; Fig. 8 a similar view of one of the spacing pieces or washers; Fig. 9 a perspective view of a rivet for rigidly securing the parts of the link together; Fig. 10 a perspective view of a portion of drive chain and a sprocket wheel, embodying a slightly modified form of my improvements, in which the spacing pieces are mounted on the pintles, the sprocket wheel and certain of the link plates partly cut away; and Fig. 11 a top plan view of a few links of the chain shown in Fig. 10.

In Fig. 1 of the drawings the construction comprises sprocket wheels 1 and 2 on which is carried a portion of drive chain composed of plates 3 adapted to arch over the teeth of the sprocket wheels, the plates of one link being interspersed upon the pintles 4 with the plates of the adjacent link. For guiding the chain to prevent lateral displacement, the sprocket wheel 2 is constructed with a circular groove or recess in which a guiding ring or flange 5 is inserted, and the ring may be made in two sections and secured in position by rivets 6, the sections of the plates being joined by a key piece as shown in Fig. 1, or in other suitable manner. The ring 5 extends outwardly to form projections 7 intermediate the sprocket teeth and these projections have semi-circular grooves 8 to provide a clearance space for the pintles of the chain. By thus providing clearance for the pintles of the chain, it will be seen that tooth like projections of the guiding ring are formed which may extend up between the pintles, preferably to or slightly above the outer periphery of the sprocket wheel. This feature is important in that the guiding of the chain is assured regardless of the position radially of the chain on the wheel.

In order to provide openings in the chain for receiving the projections of the ring 5, the chain may be constructed as shown in Figs. 4 and 5, in which spacing pieces or washers 9 are inserted between plates of the link at the middle or arch portion of the plates. The opening formed in the chain by inserting the spacing pieces may be equal in width to one or more link plates according to the thickness of guiding ring which is employed; as shown in the drawing a continuous space is provided the width of plate which necessarily requires every other link to have a spacing piece or pieces of suitable thickness to permit articulation of plates of the adjacent links. It will thus be seen that the drive chain in passing over the sprocket wheel is prevented from moving laterally by the engagement of the guiding ring in the openings in the chain; and while a guiding ring may be applied to both sprocket wheels, only one wheel need be so equipped, and furthermore there is a decided advantage in guiding on only one wheel, as the chain can then adjust itself on the free wheel to compensate for inaccuracies in alinement and other causes tending to impose undue strains on the chain.

Figure 11:
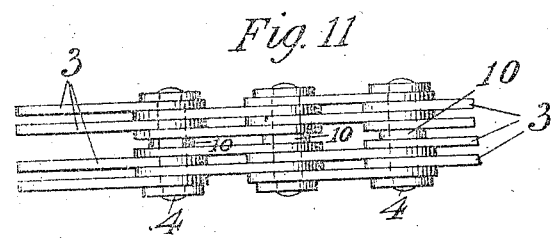

The spacing of the link plates to form an opening or groove in the chain for the guiding ring may be accomplished in various ways, other than that illustrated in Figs. 1 to 6 inclusive. For instance, as shown in Figs. 10 and 11, spacing pieces or washers 10 may be mounted on the pintles between two adjacent link plates of one link, said link plates being in turn disposed between two adjacent link plates of the adjoining links.

I provide a rigid link by inserting spacing pieces or washers 9 between the link plates at the arch over portion of the links, and according to one construction, as shown in Figs. 2 and 3, one link is built up of alternate plates 3 and spacing pieces 9, preferably of the shape shown in Fig. 8, and held together by flat rivets 11, such as shown in detail in Fig. 9, this form of rivet being preferable, as the plates are thereby held more securely in alinement and are not materially weakened. The links adjacent to the rigid links may consist merely of link plates without any spacing pieces, the links having the outside plates being preferably the rigid links, as there is more of a tendency for the working of the outside plates to cause the objectionable lateral movement of the pintles. With this construction the spacing pieces may be slightly thicker than the plates of the free link, so as to prevent any possible binding between the plates laterally.

In the construction shown in Figs. 4 and 5 every link is of the rigid type, the spacing pieces being alternated with link plates and riveted together as in the other construction. In this construction the spacing pieces are furthermore so arranged as to provide a channel for the guiding ring of the sprocket wheel as hereinbefore described.

It will be evident that the guiding projections may be formed integrally with the sprocket wheel or in any other manner as desired.

Having now described my invention, what I claim as new and desire to secure by Letters Patents, is:—

1. In a chain drive, the combination with a chain having links formed of a plurality of plates adapted to arch over the sprocket teeth, pintles joining said links, and spacing pieces between adjacent link plates to provide openings through the chain at the pintles, of a sprocket wheel having a guide projecting between the sprocket teeth and extending into said openings between the link plates.

2. A drive chain comprising links formed of a plurality of plates adapted to arch over the sprocket teeth, pintles for joining said links, the plates of one link being interspersed with the plates of the adjacent link, and spacing pieces in lieu of one or more link plates, interposed between plates of the links to form a guide opening between the plates at the pintles.

3. In a chain drive, the combination with a chain formed of arch-shaped links, and pintles joining the ends of the links, said links having radial openings at their ends around said pintles, of a sprocket wheel having a projecting guide provided with notches between the sprocket teeth and extending into said openings around the pintles.

4. In a chain drive, the combination with a chain having links formed of a plurality of plates adapted to arch over the sprocket teeth, pintles joining said links, and spacing pieces between adjacent link plates to provide openings through the chain at the pintles, of a sprocket wheel having a projecting guide ring provided with notches between the sprocket teeth and extending into said openings around the pintles.

5. A drive chain having links composed of a plurality of outside and intermediate plates adapted to arch over the sprocket teeth, the plates of one link being interspersed with the plates of the adjacent link, spacing pieces interposed between the plates of said links, and means for rigidly fastening said plates and spacing pieces of each link together.

6. A drive chain having links composed of a plurality of outside and intermediate plates adapted to arch over the sprocket teeth, the plates of one link being interspersed with the plates of the adjacent link, spacing pieces interposed between the plates at the middle portion of said links, and means for rigidly fastening said plates and spacing pieces of each link together.

7. A drive chain having links composed of a plurality of outside and intermediate plates adapted to arch over the sprocket teeth, the plates of one link being interspersed with the plates of the adjacent link, spacing pieces interposed between the plates of said links carrying the outside plates, and means for rigidly securing said plates and spacing pieces together.

8. A drive chain having links composed of a plurality of outside and intermediate plates adapted to arch over the sprocket teeth, the plates of one link being interspersed with the plates of the adjacent link, spacing pieces interposed between the plates of alternate links of the chain, and means for rigidly fastening said plates and spacing pieces together.

9. In a chain drive, the combination with a chain having links composed of a plurality of plates, the plates being spaced apart to form an opening in the chain, pintles joining the links, and a sprocket wheel provided with teeth and having a guiding projection extending out between the pintles of the chain.

10. A drive chain having links composed of a plurality of plates, the plates of adjacent links being interspersed upon the pintles, spacing pieces interposed between the plates of a link for forming an opening in the chain, and means for rigidly fastening said plates and spacing pieces.

11. In a drive chain, the combination with a chain having links composed of a plurality of plates, the plates of one link being interspersed upon the pintles with plates of the adjacent link, spacing pieces interposed between the plates of a link for forming an opening therein and for holding the plates in their relative positions, and means for rigidly fastening said plates and spacing pieces together, of a sprocket wheel having a projection extending into said opening for guiding the chain upon the wheel.

In testimony whereof I have hereunto set my hand.

FRANK L. MORSE.

Witnesses:
 WM. M. CODY,
 A. M. CLEMENTS.